United States Patent
Chen et al.

(10) Patent No.: US 12,213,115 B2
(45) Date of Patent: Jan. 28, 2025

(54) ENHANCED HIGH EFFICIENCY FRAMES FOR WIRELESS COMMUNICATIONS

(71) Applicant: Intel Corporation, Santa Clara, CA (US)

(72) Inventors: Xiaogang Chen, Portland, OR (US); Feng Jiang, Santa Clara, CA (US); Qinghua Li, San Ramon, CA (US); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 689 days.

(21) Appl. No.: 17/326,162

(22) Filed: May 20, 2021

(65) Prior Publication Data

US 2021/0274502 A1    Sep. 2, 2021

Related U.S. Application Data

(63) Continuation of application No. 17/142,526, filed on Jan. 6, 2021, which is a continuation of application No. 16/171,697, filed on Oct. 26, 2018, now abandoned.

(60) Provisional application No. 62/579,534, filed on Oct. 31, 2017.

(51) Int. Cl.
| | |
|---|---|
| *H04W 72/0453* | (2023.01) |
| *H04L 5/00* | (2006.01) |
| *H04B 7/0452* | (2017.01) |
| *H04W 84/12* | (2009.01) |

(52) U.S. Cl.
CPC ....... *H04W 72/0453* (2013.01); *H04L 5/0007* (2013.01); *H04B 7/0452* (2013.01); *H04W 84/12* (2013.01)

(58) Field of Classification Search
CPC .................................................. H04W 72/0453
See application file for complete search history.

(56) References Cited

U.S. PATENT DOCUMENTS

| | | | |
|---|---|---|---|
| 2017/0041171 A1* | 2/2017 | Li | H04L 5/0053 |
| 2017/0094664 A1* | 3/2017 | Lee | H04L 5/0028 |
| 2017/0118676 A1* | 4/2017 | Li | H04W 28/065 |
| 2019/0222392 A1* | 7/2019 | Lin | H04L 5/0094 |

* cited by examiner

*Primary Examiner* — Jackie Zuniga Abad
(74) *Attorney, Agent, or Firm* — Eversheds Sutherland (US) LLP

(57) ABSTRACT

This disclosure describes systems, methods, and devices related to using enhanced high efficiency (HE) frames. A device may determine a high efficiency signal-B (HE-SIG-B) field for a high efficiency (HE) frame, the HE-SIG-B field comprising a common information field and a user information field. The device may determine a data portion of the HE frame, wherein the data portion includes one or more resource units (RUs) with a size equal to a number of tones. The device may determine a first resource allocation subfield and a second resource allocation subfield of the common information field based at least in part on the number of tones. The device may cause to send the HE frame.

19 Claims, 7 Drawing Sheets

ENHANCED HIGH EFFICIENCY FRAMES FOR WIRELESS COMMUNICATIONS

CROSS-REFERENCE TO RELATED APPLICATION(S)

This application is a continuation of U.S. application Ser. No. 17/142,526, filed Jan. 6, 2021, which is a continuation of U.S. application Ser. No. 16/171,697, filed Oct. 26, 2018, which claims the benefit of U.S. Provisional Application No. 62/579,534, filed Oct. 31, 2017, the disclosures of which are incorporated herein by reference as if set forth in full.

TECHNICAL FIELD

This disclosure generally relates to systems and methods for wireless communications and, more particularly, to enhanced high efficiency (HE) frames for wireless communications.

BACKGROUND

Communication devices in wireless systems are becoming widely prevalent and are increasingly requesting services from other communication devices. One of these services is the ability to allocate resources to multiple devices.

DETAILED DESCRIPTION

Figure 1:
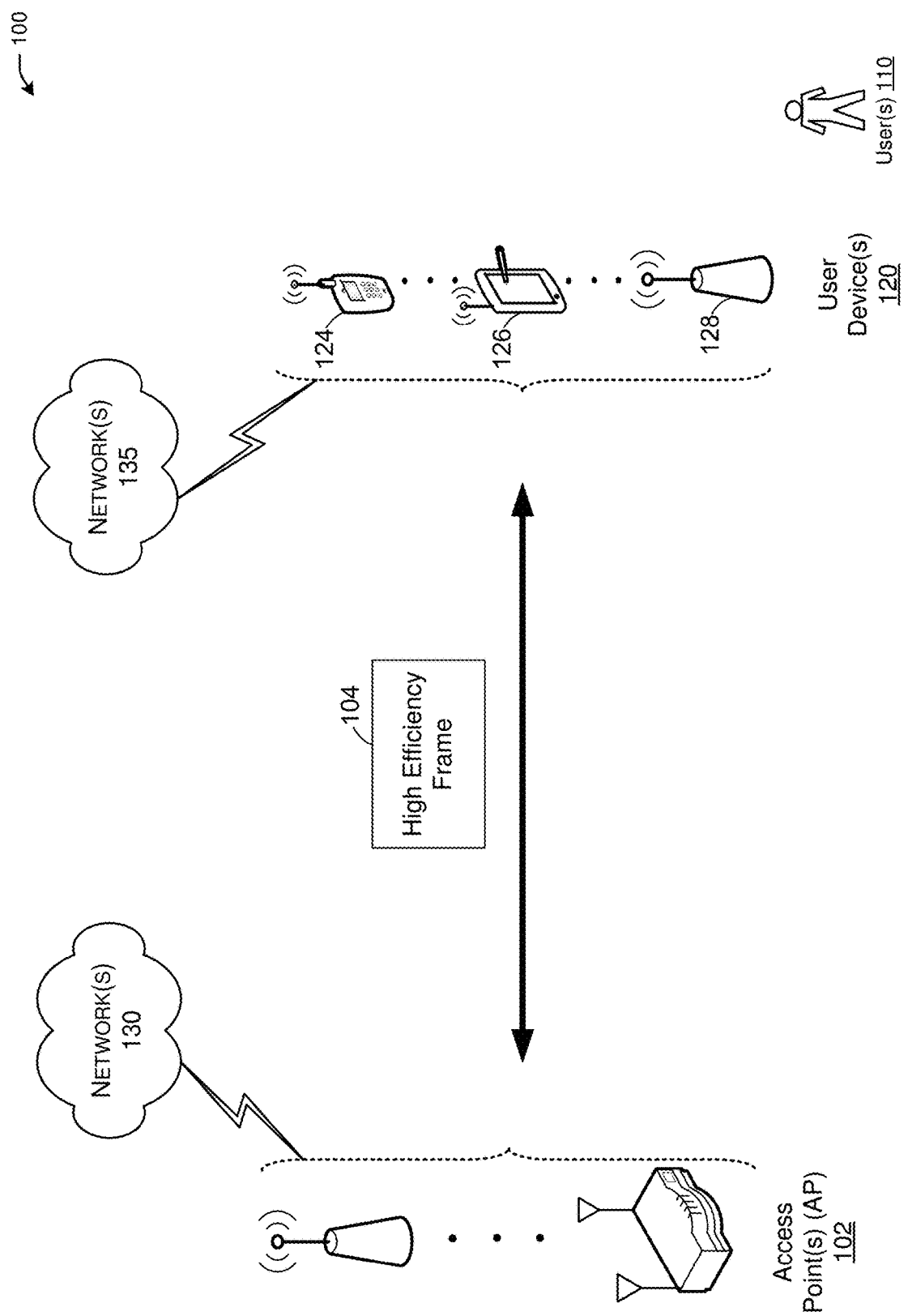
FIG. 1 depicts a network diagram illustrating an example network environment according to some example embodiments of the present disclosure.

Example embodiments described herein provide certain systems, methods, and devices for enhanced high efficiency (HE) frames for wireless communications.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

One or more devices (e.g., one or more user device(s) and/or access points (APs)) may send and/or receive a frame that includes a high efficiency signal-B (HE-SIG-B) field that precedes a data portion of the frame. The HE-SIG-B field may provide the orthogonal frequency-division multiple access (OFDMA) and/or downlink (DL) multi-user multiple input, multiple output (MU-MIMO) resource allocation (RA) information to allow the station devices (STAs) to look up the corresponding resources to be used in the data portion of the frame.

The HE-SIG-B field may be sent to one or more STAs in a 160 MHz channel. The HE-SIG-B field may be separately encoded on each 20 MHz band of the 160 MHz channel. For example, an HE-SIG-B field may include two content channels, each of which may be duplicated four times, each on a 20 MHz band. The encoding structure in one such 20 MHz band may include a common information field, if present, followed by a user information field (also referred to as a user specific information field), which together are referred to as the HE-SIG-B content channel. In the case of a 160 MHz physical layer protocol data unit (PPDU), the 160 MHz PPDU may include two HE-SIG-B content channels (e.g., an HE-SIG-B content channel 1 and an HE-SIG-B content channel 2).

An HE-SIG-B common information field and a user information field of a high efficiency (HE) frame may be defined for a case with 160 MHz/80+80 MHz with multi-user multiple input, multiple output (MU-MIMO) populated in one 996 tone resource unit (RU) and an orthogonal frequency-division multiple access (OFDMA) transmission populated in another 996 tone RU.

Two adjacent resource allocation subfields of the common information field of the HE-SIG-B field may point to the same user information fields in a given content channel. Therefore, there may be a need to set the content of the two adjacent resource allocation subfields pointing to a same user information field.

Example embodiments described herein provide certain systems, methods, and devices for enhanced HE frames, including, but not limited to, HE frames in the IEEE 802.11 family of standards, including the IEEE 802.11ax standard.

In one or more embodiments, an enhanced HE frames system (e.g., one or more user device(s) and/or access points (APs)) may send and/or receive a frame that includes an HE-SIG-B field that precedes a data portion of the frame. The HE-SIG-B field may provide the OFDMA and DL MU-MIMO resource allocation information to allow the STA that receives the frame to look up the corresponding resources to be used in the data portion of the frame.

In one or more embodiments, the enhanced HE frames system may separately encode the HE-SIG-B field on each 20 MHz band of a 160 MHz channel. The encoding structure in one such 20 MHz band may include a common information field, if present, followed by a user information field, which together are referred to as the HE-SIG-B content channel.

In one or more embodiments, the enhanced HE frames system may determine the common information field of an HE-SIG-B content channel. The common information field may contain information regarding the resource unit allocation (RA), such as the resource unit (RU) assignment to be used in the data portion in the frequency domain, the RUs allocated for MU-MIMO, and/or the number of users in MU-MIMO allocations.

In one or more embodiments, the enhanced HE frames system may determine the user information field of an HE-SIG-B content channel. The user information field may include zero or more User Block fields followed by padding (if present). Each User Block field may be made up of two user information fields that contain information for two STAs to decode their payloads. The last User Block field may contain information for one or two STAs depending on the number of users indicated by the RU Allocation field and the Center 26-tone RU field.

In one or more embodiments, the enhanced HE frames system may determine a 160 MHz physical layer protocol data unit (PPDU). The 160 MHz PPDU may contain two HE-SIG-B content channels, each of which may be duplicated four times. For example, each of the two HE-SIG-B content channels may be sent in a 20 MHz band and duplicated three additional times, resulting in the first content channel and its duplicates being sent over an 80 MHz band and the second content channel and its duplicates being sent over another 80 MHz band.

In one or more embodiments, the enhanced HE frames system may determine an HE-SIG-B content channel 1. The HE-SIG-B content channel 1 may include a 32 bit common information field comprising four 8 bit RA subfields. The HE-SIG-B content channel 1 may further include a user information field comprising four user information subfields. The HE-SIG-B content channel 1 may be duplicated such that four instances of HE-SIG-B content channel 1 are sent over four 20 MHz bands of the 160 MHz channel. For example, HE-SIG-B content channel 1 may occupy the 20 MHz frequency segment that is lowest in frequency and may be duplicated on the 20 MHz frequency segments that are third, fifth, and seventh lowest in frequency.

In one or more embodiments, the enhanced HE frames system may determine an HE-SIG-B content channel 2. The HE-SIG-B content channel 2 may include a 32 bit common information field comprising four 8 bit RA subfields. The HE-SIG-B content channel 2 may further include a user information field comprising four user information subfields. The HE-SIG-B content channel 2 may be duplicated such that four instances of HE-SIG-B content channel 2 are sent over four 20 MHz bands of the 160 MHz channel. For example, HE-SIG-B content channel 2 may occupy the 20 MHz frequency segment that is second lowest in frequency and may be duplicated on the 20 MHz frequency segments that are fourth, sixth, and eighth lowest in frequency.

In one or more embodiments, the enhanced HE frames system may determine a first HE-SIG-B content channel of a 160 MHz PPDU that may carry a common information field and a user information field corresponding to RUs signaled in the common information field. The common information field of HE-SIG-B content channel 1 may contain a first RU Allocation subfield for RUs with subcarrier indices in a first range of subcarrier indices, followed by a second RU Allocation subfield for RUs with subcarrier indices in a second range of subcarrier indices, followed by a third RU Allocation subfield for RUs with subcarrier indices in a third range of subcarrier indices, followed by a fourth RU Allocation subfield for RUs with subcarrier indices in a fourth range of subcarrier indices. A range of indices refers to a subset of indices that correspond to a subset of tones of an RU.

In one or more embodiments, the enhanced HE frames system may determine a second HE-SIG-B content channel of a 160 MHz PPDU that may carry a common information field and a user information field corresponding to RUs signaled in the common information field. The common information field of HE-SIG-B content channel 2 may contain a first RU Allocation subfield for RUs with subcarrier indices in a first range of subcarrier indices, followed by a second RU Allocation subfield for RUs with subcarrier indices in a second range of subcarrier indices, followed by a third RU Allocation subfield for RUs with subcarrier indices in a third range of subcarrier indices, followed by a fourth RU Allocation subfield for RUs with subcarrier indices in a fourth range of subcarrier indices.

In one or more embodiments, the enhanced HE frames system may determine a modified mapping of the two HE-SIG-B content channels. In the case of an RU with a size that equals 996 tones, there may be an ambiguity in which two RU Allocation subfields (e.g., RA 1 and RA 3 for content channel 1 and RA 2 and RA 4 for content channel 2) point to the same user information fields. For example, each 8 bit RA in a 20 MHz channel indicates the user resource allocation structure in that 20 MHz channel. In a 160 MHz/80+80 MHz channel scenario, RA 1 and RA 3 point to the same user information field in content channel 1. In other words, RA 1 and RA 3 include a resource allocation for 20 MHz channel 1 and for 20 MHz channel 3. If the data is on an 80 MHz channel, then RA 1 and RA 3 will point to the same user information field because user information subfield (UF) 1 and UF 3 are included in the same 80 MHz channel. Similarly, RA 2 and RA 4 will point to the same user information field because UF 2 and UF 4 are included in the same 80 MHz channel.

In one or more embodiments, the enhanced HE frames system may determine a 160 MHz/80+80 MHz channel with a first multi-user scheme (e.g., MU-MIMO and/or OFDMA) populated in one 996 tone RU and a second multi-user scheme (e.g., MU-MIMO and/or OFDMA) populated in a second 996 tone RU).

In one or more embodiments, the enhanced HE frames system may determine a modified mapping of the two HE-SIG-B content channels. The modified mapping of the two HE-SIG-B content channels may determine that the content that corresponds to RA 3 of HE-SIG-B content channel 1 may be set to 0 and the content that corresponds to RA 4 of HE-SIG-B content channel 2 may be set to 0. In such a scenario, the receiving STA may determine RA 1 and RA 3 for HE-SIG-B content channel 1 and RA 2 and RA 4 for HE-SIG-B content channel 2.

In one or more embodiments, the enhanced HE frames system may determine that HE-SIG-B content channel 1 may include a 32 bit common information field comprising RA 1, RA 3=0, RA 5, and RA 7. The HE-SIG-B content channel 1 may further include user information field that includes UF 1, UF 5, and UF 7. The HE-SIG-B content channel 1 may be duplicated such that four copies of HE-SIG-B content channel 1 are sent over four 20 MHz bands of the 160 MHz channel. For example, HE-SIG-B content channel 1 may occupy the 20 MHz frequency segment that is lowest in frequency and may be duplicated on the 20 MHz frequency segments that are third, fifth, and seventh lowest in frequency.

In one or more embodiments, the enhanced HE frames system may determine that HE-SIG-B content channel 2 may include a 32 bit common information field comprising RA 2, RA 4=0, RA 6, and RA 8. The HE-SIG-B content channel 2 may further include a user information field that includes UF 2, UF 6, and UF 8. The HE-SIG-B content channel 2 may be duplicated such that four copies of HE-SIG-B content channel 2 are sent over four 20 MHz bands of the 160 MHz channel. For example, HE-SIG-B content channel 2 may occupy the 20 MHz frequency segment that is second lowest in frequency and may be duplicated on the 20 MHz frequency segments that are fourth, sixth, and eighth lowest in frequency.

In one or more embodiments, the enhanced HE frames system may determine the first 8-bit RU Allocation subfield of the common information field of each HE-SIG-B content channel. For example, for each HE-SIG-B content channel, the first 8-bit RU Allocation subfield used to signal the 996-tones RU may use entry 11010y2y1y0, wherein y2y1y0 may indicate the number of user information fields signaled in the corresponding content channel. Specifically, y2y1y0 is a binary vector with values that range from 000-111 and is indicative of the number of user information fields in the HE-SIG-B content channel.

In one or more embodiments, the enhanced HE frames system may determine the second 8-bit RU Allocation subfield of the common information field of each HE-SIG-B content channel. For example, for each HE-SIG-B content channel, the second 8-bit RU Allocation subfield used to signal that 996-tones RU (e.g., RA 3 for content channel 1 and RA 4 for content channel 2) shall be set to 01110011. The entry 01110011 may indicate a 996-tone RU with zero user information fields indicated in this RU Allocation subfield of the HE-SIG-B content channel.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 depicts a network diagram illustrating an example network environment, according to some example embodiments of the present disclosure. Wireless network 100 may include one or more user devices 120 and one or more responding device(s) (e.g., AP 102), which may communicate in accordance with IEEE 802.11 communication standards. The user device(s) 120 may be mobile devices that are non-stationary (e.g., not having fixed locations) or may be stationary devices.

Figure 5:
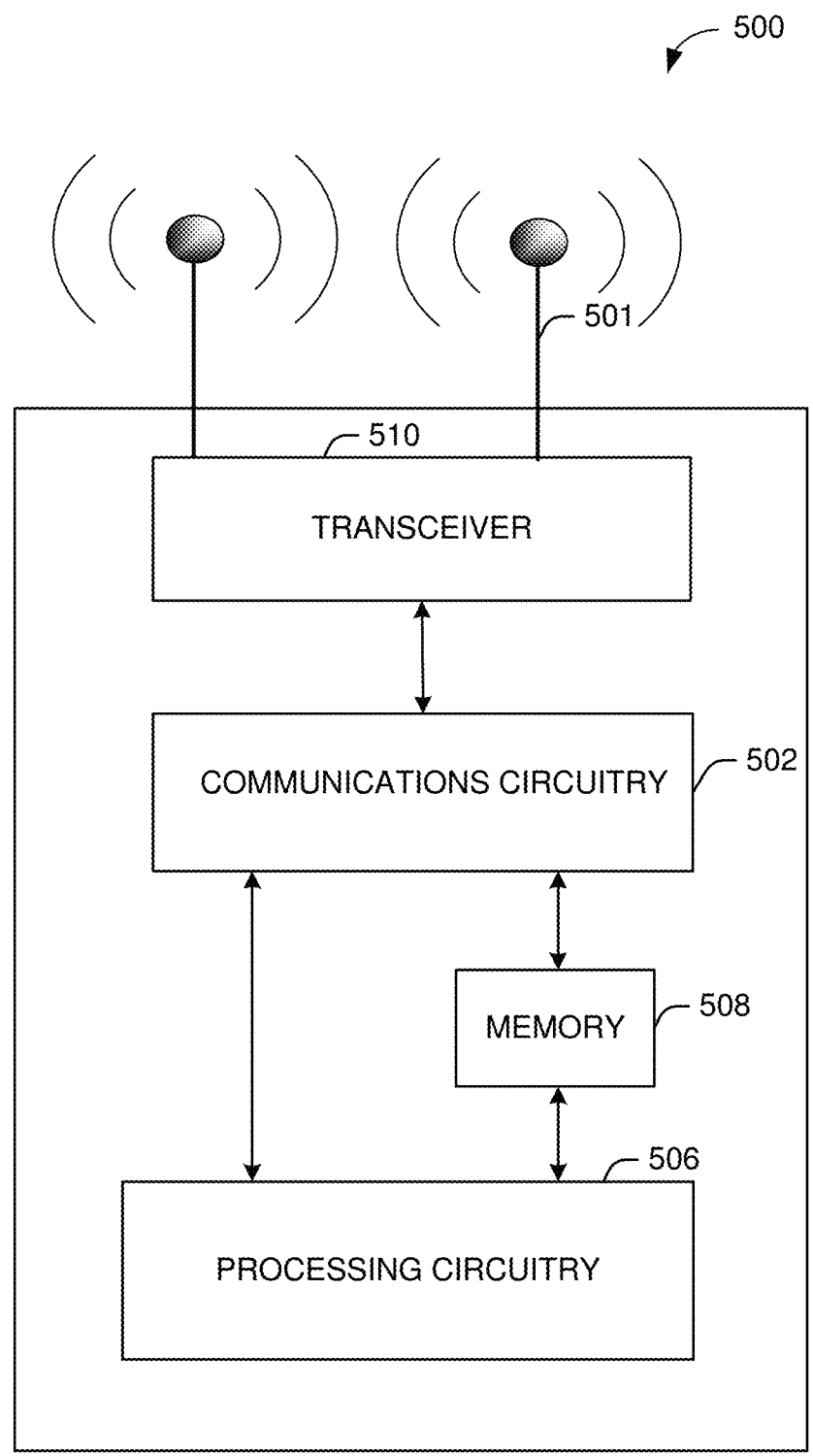
FIG. 5 depicts a functional diagram of an example communication station that may be suitable for use as a user device, in accordance with one or more example embodiments of the present disclosure.
Figure 6:
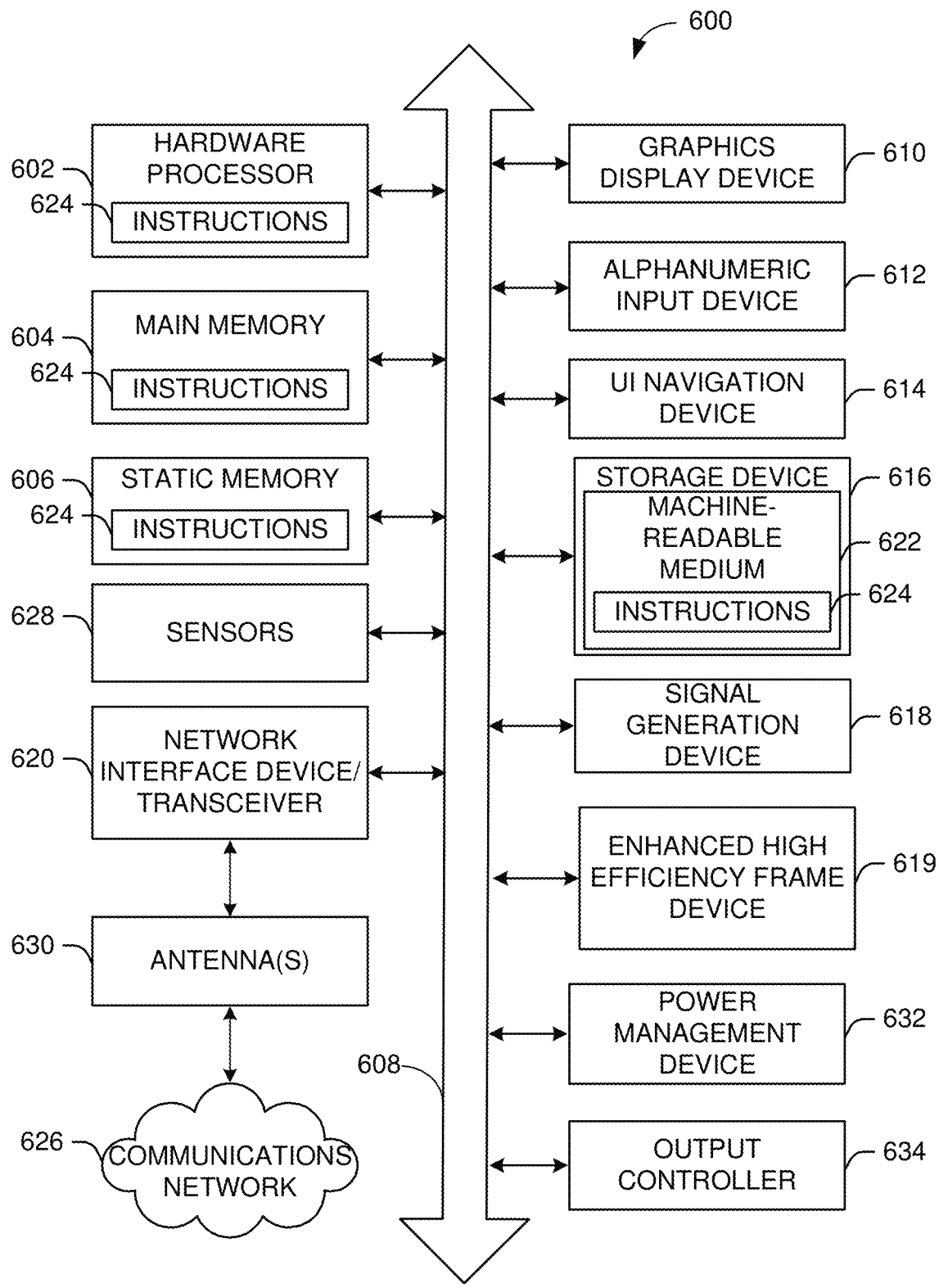
FIG. 6 depicts a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 5 and/or the example machine/system of FIG. 6.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128) and/or AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and/or AP(s) 102 may include one or more communications antennas. The one or more communications antennas may be any suitable type of antennas corresponding to the communications protocols used by the user device(s) 120 (e.g., user devices 124, 126 and 128) and/or AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128) and/or AP(s) 102 may be configured to perform directional transmission and/or directional reception in conjunction with wirelessly communicating in a wireless network. Any of the user device(s) 120 (e.g., user devices 124, 126, 128) and/or AP(s) 102 may be configured to perform such directional transmission and/or reception using a set of multiple antenna arrays (e.g., directional multi-gigabit (DMG) antenna arrays or the like). Each of the multiple antenna arrays may be used for transmission and/or reception in a particular respective direction or range of directions. Any of the user device(s) 120 (e.g., user devices 124, 126, 128) and/or AP(s) 102 may be configured to perform any given directional transmission towards one or more defined transmit sectors. Any of the user device(s) 120 (e.g., user devices 124, 126, 128) and/or AP(s) 102 may be configured to perform any given directional reception from one or more defined receive sectors.

Multiple Input, Multiple Output (MIMO) beamforming in a wireless network may be accomplished using radio frequency (RF) beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128) and/or AP(s) 102 may include any suitable radio and/or transceiver for transmitting and/or receiving radio frequency (RF) signals in the bandwidth and/or channels corresponding to the communications protocols utilized by any of the user device(s) 120 and/or AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHz channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When an AP (e.g., AP 102 of FIG. 1) establishes communication with one or more user devices 120 (e.g., user devices 124, 126, and/or 128 of FIG. 1), the AP 102 may communicate in a downlink direction and the user devices 120 may communicate with the AP 102 in an uplink direction by sending frames in either direction. The user devices 120 may also communicate peer-to-peer or directly with each other with or without the AP 102. The frames may be preceded by one or more preambles that may be part of one or more headers. These preambles may be used to allow a device (e.g., AP 102 and/or user devices 120) to detect a new incoming data frame from another device. A preamble may be a signal used in network communications to synchronize transmission timing between two or more devices (e.g., between the APs and user devices).

The IEEE 802.11 standard defines various frame types that devices may use for communications as well as managing and controlling the wireless link. These frame types may include data frames or signaling frames. The signaling frames may be divided into control frames and management frames. Management frames enable devices to establish and maintain communications. Some examples of management frames may include, but are not limited to, fine timing measurement frame, authentication frames, association request frame, association response frame, beacon frame, etc. Control frames may assist in the delivery of data frames between devices. Some examples of control frames may include, but are not limited to, request to send frame, clear to send frame, acknowledgment frame, etc.

Typically, control frames have limited and simpler structures than management frames. Meaning that baseband processing may process control frames using a simpler procedure, resulting in faster processing. However, control frames are less flexible than management frames.

Any of the user device(s) 120 (e.g., user devices 124, 126, 128) and/or AP 102 may be configured to communicate with each other via one or more communications networks 130 and/or 135 wirelessly or wired. Any of the communications networks 130 and/or 135 may include, but not are limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

In one embodiment, and with reference to FIG. 1, when an AP (e.g., AP(s) 102) establishes communication with one or more user devices 120 (e.g., user devices 124, 126, and/or 128), the AP 102 may communicate in a downlink direction and the user devices 120 may communicate with the AP 102 in an uplink direction by sending frames in either direction. In some examples, the AP 102 may send an HE frame 104 to the user devices 120 in the downlink direction. Data frames sent between the AP(s) 102 and the user devices 120 may be preceded by one or more preambles that may be part of one or more headers. These preambles may be used to allow a device (e.g., AP(s) 102 and/or user devices 120) to detect a new incoming data frame from another device.

It is understood that the above descriptions are for purposes of illustration and are not meant to be limiting.

Figure 2:
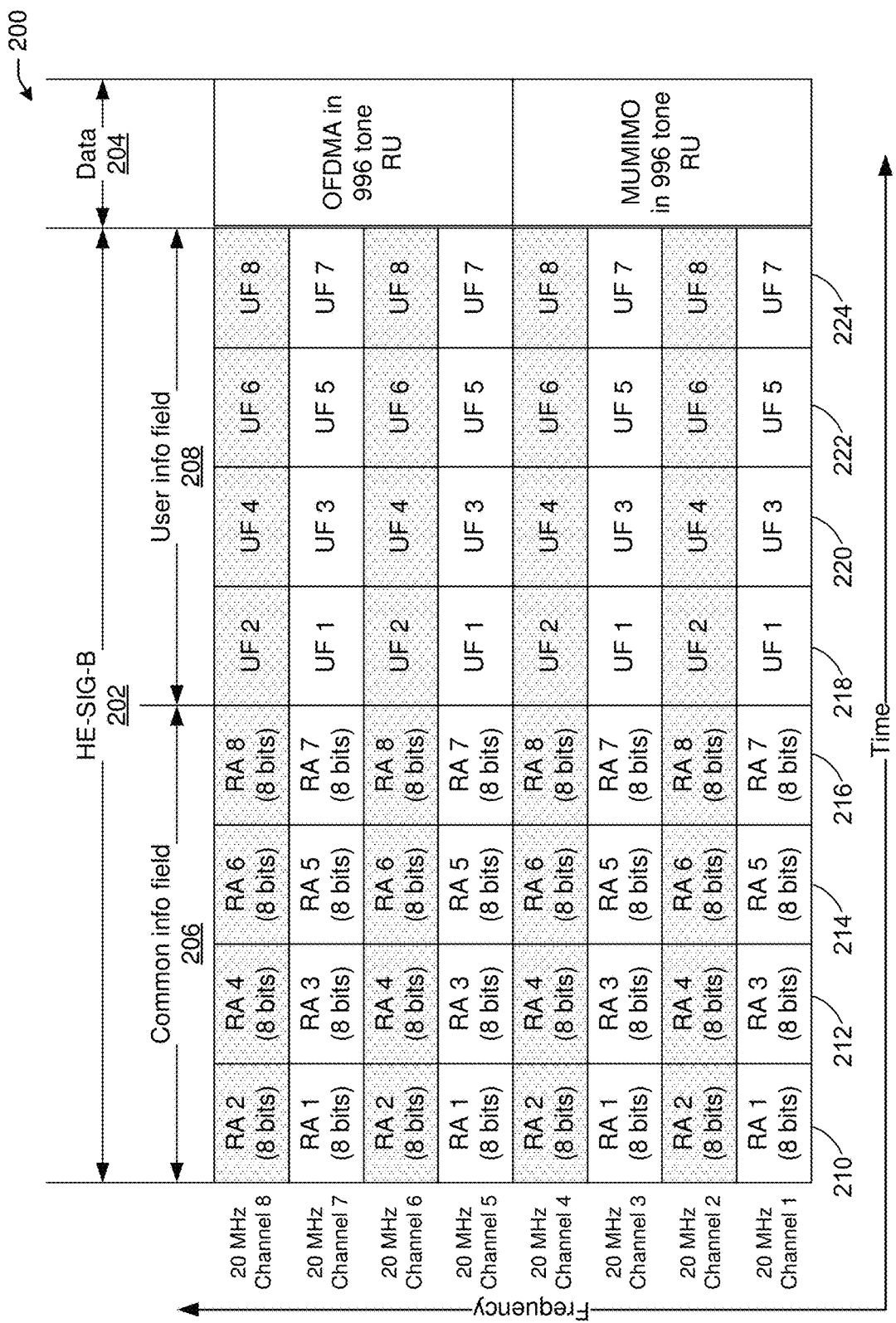
FIG. 2 illustrates a frame format of a portion of a high efficiency signal-B (HE-SIG-B) field.

FIG. 2 illustrates a frame format of a portion 200 of a HE-SIG-B frame.

In one or more embodiments, the portion 200 of an HE frame may include an HE-SIG-B field 202 of the HE frame that precedes a data portion 204 of the frame. The HE-SIG-B field 202 may provide the OFDMA and DL MU-MIMO resource allocation information to allow the STAs to look up the corresponding resources to be used in the data portion 204 of the frame.

The HE-SIG-B field 202 may be separately encoded on each 20 MHz band of a 160 MHz channel. The encoding structure in one such 20 MHz band may include a common information field 206, if present, followed by a user information field 208, which together are referred to as the HE-SIG-B content channel.

The common information field 206 of an HE-SIG-B content channel may contain information regarding the resource unit allocation (e.g., RA 1 210), such as the resource unit (RU) assignment to be used in the data portion 204 in the frequency domain, the RUs allocated for MU-MIMO, and/or the number of users in MU-MIMO allocations.

The user information field 208 of an HE-SIG-B content channel may include zero or more User Block fields followed by padding (if present). Each User Block field may be made up of two user information fields that contain information for two STAs to decode their payloads. The last User Block field may contain information for one or two STAs depending on the number of users indicated by the RU Allocation field and the Center 26-tone RU field.

In the case of a 160 MHz physical layer protocol data unit (PPDU), the 160 MHz PPDU may contain two HE-SIG-B content channels, each of which may be duplicated four times, as shown in FIG. 2. For example, FIG. 2 illustrates the mapping of the two HE-SIG-B content channels and their duplication in a 160 MHz PPDU.

HE-SIG-B content channel 1 may include a 32 bit common information field 206 comprising RA 1 210, RA 3 212, RA 5 214, and RA 7 216. HE-SIG-B content channel 1 may further include user information field 208 that includes UF 1 218, UF 3 220, UF 5 222, and UF 7 224. The HE-SIG-B content channel 1 may be duplicated such that four copies of HE-SIG-B content channel 1 are sent over four 20 MHz bands of the 160 MHz channel (e.g., 20 MHz Channel 1, 20 MHz Channel 3, 20 MHz Channel 5, and 20 MHz Channel 7). In other words, HE-SIG-B content channel 1 may occupy the 20 MHz frequency segment that is lowest in frequency and may be duplicated on the 20 MHz frequency segments that are third, fifth, and seventh lowest in frequency.

HE-SIG-B content channel 2 may include a 32 bit common information field 206 comprising RA 2, RA 4, RA 6, and RA 8. HE-SIG-B content channel 2 may further include user information field 208 that includes UF 2, UF 4, UF 6, and UF 8. The HE-SIG-B content channel 2 may be duplicated such that four copies of HE-SIG-B content channel 2 are sent over four 20 MHz bands of the 160 MHz channel (e.g., 20 MHz Channel 2, 20 MHz Channel 4, 20 MHz Channel 6, and 20 MHz Channel 8). In other words, HE-SIG-B content channel 2 may occupy the 20 MHz frequency segment that is second lowest in frequency and may be duplicated on the 20 MHz frequency segments that are fourth, sixth, and eighth lowest in frequency.

The first HE-SIG-B content channel of the 160 MHz PPDU may carry a common information field 206 and a user information field 208 corresponding to RUs signaled in the common information field 206. The common information field 206 of HE-SIG-B content channel 1 may contain a first RU Allocation subfield RA 1 210 for RUs with subcarrier indices in a first range of subcarrier indices (e.g., [−1012:−771] or overlapping with [−1012:−771] if the RU is larger than 242 subcarriers), followed by a second RU Allocation subfield RA 3 212 for RUs with subcarrier indices in a second range of subcarrier indices (e.g., [−495:−254] or overlapping with [−495:−254] if the RU is larger than 242 subcarriers), followed by a third RU Allocation subfield RA 5 214 for RUs with subcarrier indices in a third range of subcarrier indices (e.g., [12:253] or overlapping with [12:253] if the RU is larger than 242 subcarriers), followed by a fourth RU Allocation subfield RA 7 216 for RUs with subcarrier indices in a fourth range of subcarrier indices (e.g., [529:770] or overlapping with [529:770] if the RU is larger than 242 subcarriers). The common information field 206 of HE-SIG-B content channel 1 may further be followed by 1 bit Center 26-tone RU subfield to indicate the presence of the user information field 208 corresponding to the center 26-tone RU that spans subcarriers [−528:−516, −508:−496].

The second HE-SIG-B content channel of the 160 MHz PPDU may carry a common information field 206 and a user information field 208 corresponding to RUs signaled in the common information field 206. The common information field 206 of HE-SIG-B content channel 2 may contain a first RU Allocation subfield RA 2 for RUs with subcarrier indices in a first range of subcarrier indices (e.g., [−770:529] or overlapping with [−770:−529] if the RU is larger than 242 subcarriers), followed by a second RU Allocation subfield RA 4 for RUs with subcarrier indices in a second range of subcarrier indices (e.g., [−253:−12] or overlapping with [−253:−12] if the RU is larger than 242 subcarriers), followed by a third RU Allocation subfield RA 6 for RUs with subcarrier indices in a third range of subcarrier indices (e.g., [254:495] or overlapping with [254:495] if the RU is larger than 242 subcarriers), followed by a fourth RU Allocation subfield RA 8 for RUs with subcarrier indices in a fourth range of subcarrier indices (e.g., [771:1012] or overlapping with [771:1012] if the RU is larger than 242 subcarriers). The common information field 206 of HE-SIG-B content channel 2 may further be followed by 1 bit Center 26-tone RU subfield to indicate the presence of the user information field 208 corresponding to the center 26-tone RU that spans subcarriers [496:508, 516:528].

Note that in the case of an RU with a size that equals 996 tones (e.g., in the scenario of a 160 MHz/80+80 MHz channel with a first multi-user scheme (e.g., MU-MIMO and/or OFDMA) populated in one 996 tone RU and a second multi-user scheme (e.g., MU-MIMO and/or OFDMA) populated in a second 996 tone RU, there may be an ambiguity in which two RU Allocation subfields (e.g., RA 1 and RA 3 for content channel 1 and RA 2 and RA 4 for content channel 2) point to the same user information subfields. In other words, two adjacent resource allocation subfields may point to the same user information subfields in a given channel. Therefore, there may be a need to set the content of the two adjacent resource allocation subfields in such a scenario.

It is understood that the above descriptions are for purposes of illustration and are not meant to be limiting.

Figure 3:
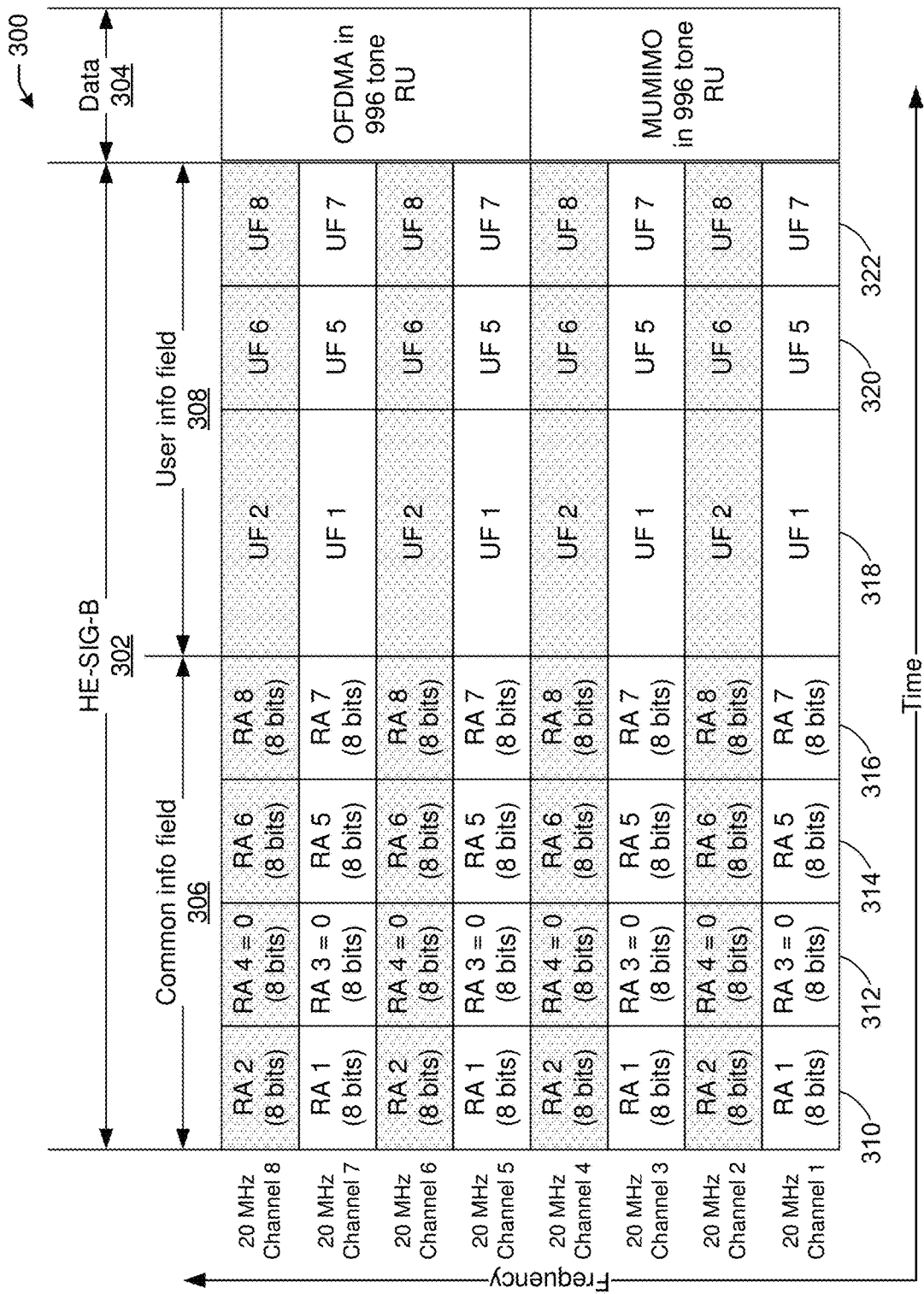
FIG. 3 illustrates a frame format of a portion of a HE-SIG-B field, in accordance with one or more example embodiments of the present disclosure.

FIG. 3 illustrates a frame format of a portion 300 of an HE frame, in accordance with one or more example embodiments of the present disclosure.

In one or more embodiments, the portion 300 of an HE frame may include an HE-SIG-B field 302 of the HE frame that precedes a data portion 304 of the frame. The HE-SIG-B field 302 may provide the OFDMA and DL MU-MIMO resource allocation information to allow the STAs to look up the corresponding resources to be used in the data portion 304 of the frame.

The HE-SIG-B field 302 may be separately encoded on each 20 MHz band of a 160 MHz channel. The encoding structure in one such 20 MHz band may include a common information field 306, if present, followed by a user information field 308, which together are referred to as the HE-SIG-B content channel.

The common information field 306 of an HE-SIG-B content channel may contain information regarding the resource unit allocation (e.g., RA 1 310), such as the resource unit (RU) assignment to be used in the data portion 304 in the frequency domain, the RUs allocated for MU-MIMO, and/or the number of users in MU-MIMO allocations.

The user information field 308 of an HE-SIG-B content channel may include zero or more User Block fields followed by padding (if present). Each User Block field may be made up of two user information fields that contain information for two STAs to decode their payloads. The last User Block field may contain information for one or two STAs depending on the number of users indicated by the RU Allocation field and the Center 26-tone RU field.

As discussed above with respect to FIG. 2, in the case of an RU with a size that equals 996 tones (e.g., in the scenario of a 160 MHz/80+80 MHz channel with a first multi-user scheme (e.g., MU-MIMO and/or OFDMA) populated in one 996 tone RU and a second multi-user scheme (e.g., MU-MIMO and/or OFDMA) populated in a second 996 tone RU), there may be an ambiguity in which two RU Allocation subfields (e.g., RA 1 and RA 3 for content channel 1 and RA 2 and RA 4 for content channel 2) point to the same user information fields. To address this ambiguity, a modified mapping of the two HE-SIG-B content channels may be used. Specifically, the content that corresponds to RA 3 of HE-SIG-B content channel 1 may be set to 0 and the content that corresponds to RA 4 of HE-SIG-B content channel 2 may be set to 0. In such a scenario, the receiving STA may parse RA 1 and RA 3 for HE-SIG-B content channel 1 and RA 2 and RA 4 for HE-SIG-B content channel 2.

In the case of a 160 MHz physical layer protocol data unit (PPDU), the 160 MHz PPDU may contain two HE-SIG-B content channels, each of which may be duplicated four times, as shown in FIG. 3. For example, FIG. 3 illustrates the modified mapping of the two HE-SIG-B content channels and their duplication in a 160 MHz PPDU.

HE-SIG-B content channel 1 may include a 32 bit common information field 306 comprising RA 1 310, RA 3=0 312, RA 5 314, and RA 7 316. HE-SIG-B content channel 1 may further include user information field 308 that includes UF 1 318, UF 5 320, and UF 7 322. The HE-SIG-B content channel 1 may be duplicated such that four copies of HE-SIG-B content channel 1 are sent over four 20 MHz bands of the 160 MHz channel (e.g., 20 MHz Channel 1, 20 MHz Channel 3, 20 MHz Channel 5, and 20 MHz Channel 7). In other words, HE-SIG-B content channel 1 may occupy the 20 MHz frequency segment that is lowest in frequency and may be duplicated on the 20 MHz frequency segments that are third, fifth, and seventh lowest in frequency.

HE-SIG-B content channel 2 may include a 32 bit common information field 306 comprising RA 2, RA 4=0, RA 6, and RA 8. HE-SIG-B content channel 2 may further include user information field 308 that includes UF 2, UF 6, and UF 8. The HE-SIG-B content channel 2 may be duplicated such that four copies of HE-SIG-B content channel 2 are sent over four 20 MHz bands of the 160 MHz channel (e.g., 20 MHz Channel 2, 20 MHz Channel 4, 20 MHz Channel 6, and 20 MHz Channel 8). In other words, HE-SIG-B content channel 2 may occupy the 20 MHz frequency segment that is second lowest in frequency and may be duplicated on the 20 MHz frequency segments that are fourth, sixth, and eighth lowest in frequency.

As noted above, if the RU size equals 996 tones, for each HE-SIG-B content channel (e.g., for HE-SIG-B content channel 1 and for HE-SIG-B content channel 2), a modified mapping of the two HE-SIG-B content channels may be used. For example, for each HE-SIG-B content channel, the first 8-bit RU Allocation subfield used to signal that 996-tones RU (e.g., RA 1 310 of HE-SIG-B content channel 1 and RA 2 of HE-SIG-B content channel 2) may use entry 11010y2y1y0, wherein y2y1y0 may indicate the number of user information fields signaled in the corresponding content channel. Specifically, y2y1y0 is a binary vector with values that range from 000-111 and is indicative of the number of user information fields in the HE-SIG-B content channel. Furthermore, for each HE-SIG-B content channel, the second 8-bit RU Allocation subfield used to signal that 996-tones RU (e.g., RA 3 312 for content channel 1 and RA 4 for content channel 2) shall be set to 01110011. The entry 01110011 may indicate a 996-tone RU with zero user information fields 308 indicated in this RU Allocation subfield of the HE-SIG-B content channel. Note that the binary vector y2y1y0 indicates $2^2 \times y2 + 2^1 \times y1 + y0 + 1$ STAs multiplexed the RU.

It is understood that the above descriptions are for purposes of illustration and are not meant to be limiting.

Figure 4A:
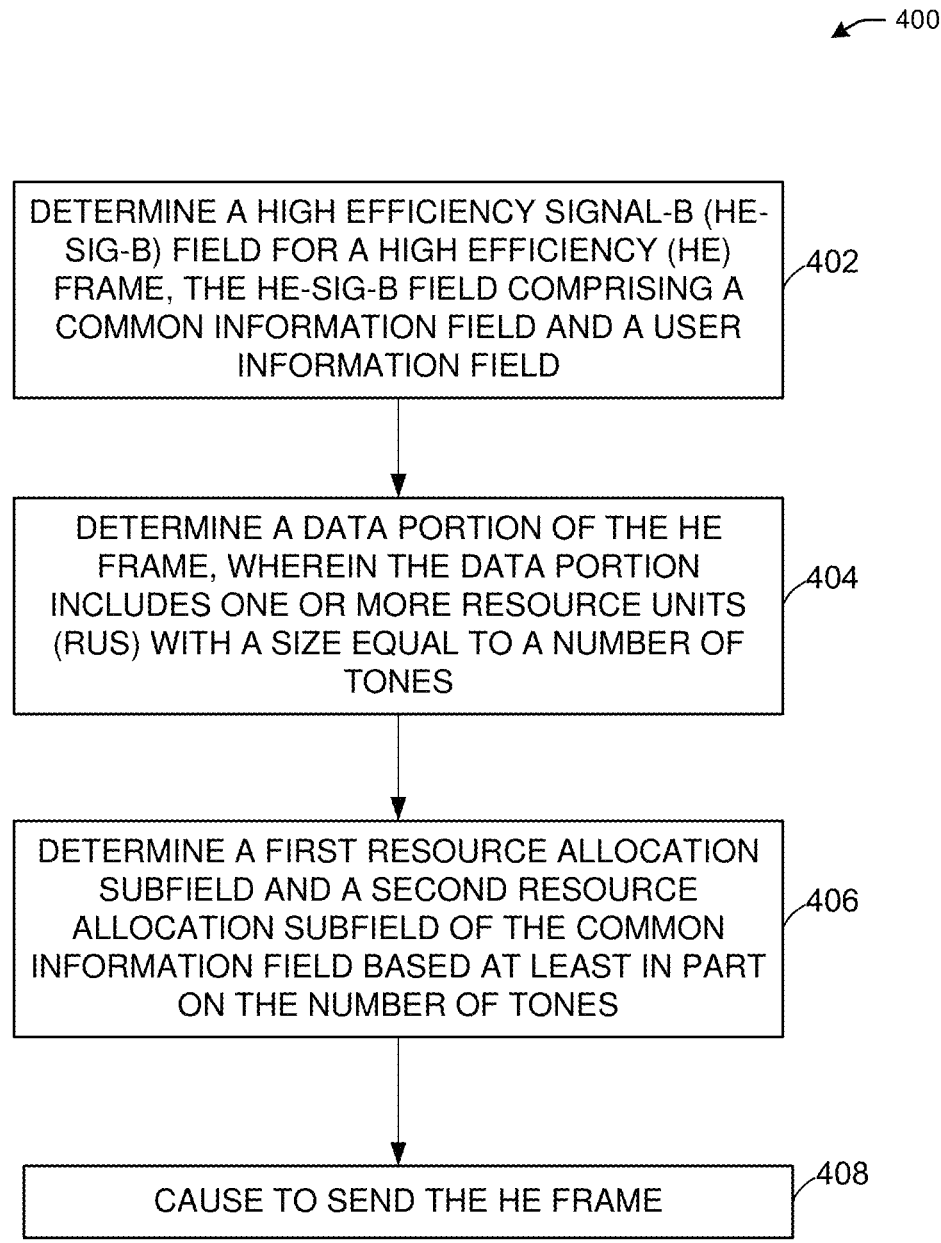
FIG. 4A depicts a flow diagram of an illustrative process for using enhanced HE frames, in accordance with one or more example embodiments of the present disclosure.

FIG. 4A depicts a flow diagram of an illustrative process 400 for using enhanced HE frames, in accordance with one or more example embodiments of the present disclosure.

At block 402, one or more processors of a device (e.g., AP 102 of FIG. 1) may determine a high efficiency signal-B (HE-SIG-B) field for a high efficiency (HE) frame, the HE-SIG-B field comprising a common information field and a user information field. The HE-SIG-B field may comprise a first HE-SIG-B content channel and a second HE-SIG-B content channel. The common information field may be a first common information field that corresponds to the first HE-SIG-B content channel. The device may further comprise a transceiver configured to transmit and receive wireless signals. The device may further comprise one or more antennas coupled to the transceiver.

At block 404, the one or more processors of the device may determine a data portion of the HE frame, wherein the data portion includes one or more resource units (RUs) with a size equal to a number of tones. The data portion may comprise an orthogonal frequency-division multiple access (OFDMA) 996 tone RU and a multi-user multiple input, multiple output (MU-MIMO) 996 tone RU.

At block 406, the one or more processors of the device may determine a first resource allocation subfield and a second resource allocation subfield of the common information field based at least in part on the number of tones. The first resource allocation subfield may be based at least in part on a number of devices that multiplexed the RU. The device may determine a third resource allocation subfield and a fourth resource allocation subfield of a second common information field that corresponds to the second HE-SIG-B content channel, wherein the third resource allocation subfield and the fourth resource allocation subfield are based at least in part on the number of tones.

At block 408, the one or more processors of the device may cause the device to send the HE frame. The HE frame may be sent in a 160 MHz channel, wherein the OFDMA 996 tone RU may be sent in a first 80 MHz subchannel and the MU-MIMO 996 tone RU may be sent in a second 80 MHz subchannel.

It is understood that the above descriptions are for purposes of illustration and are not meant to be limiting.

Figure 4B:
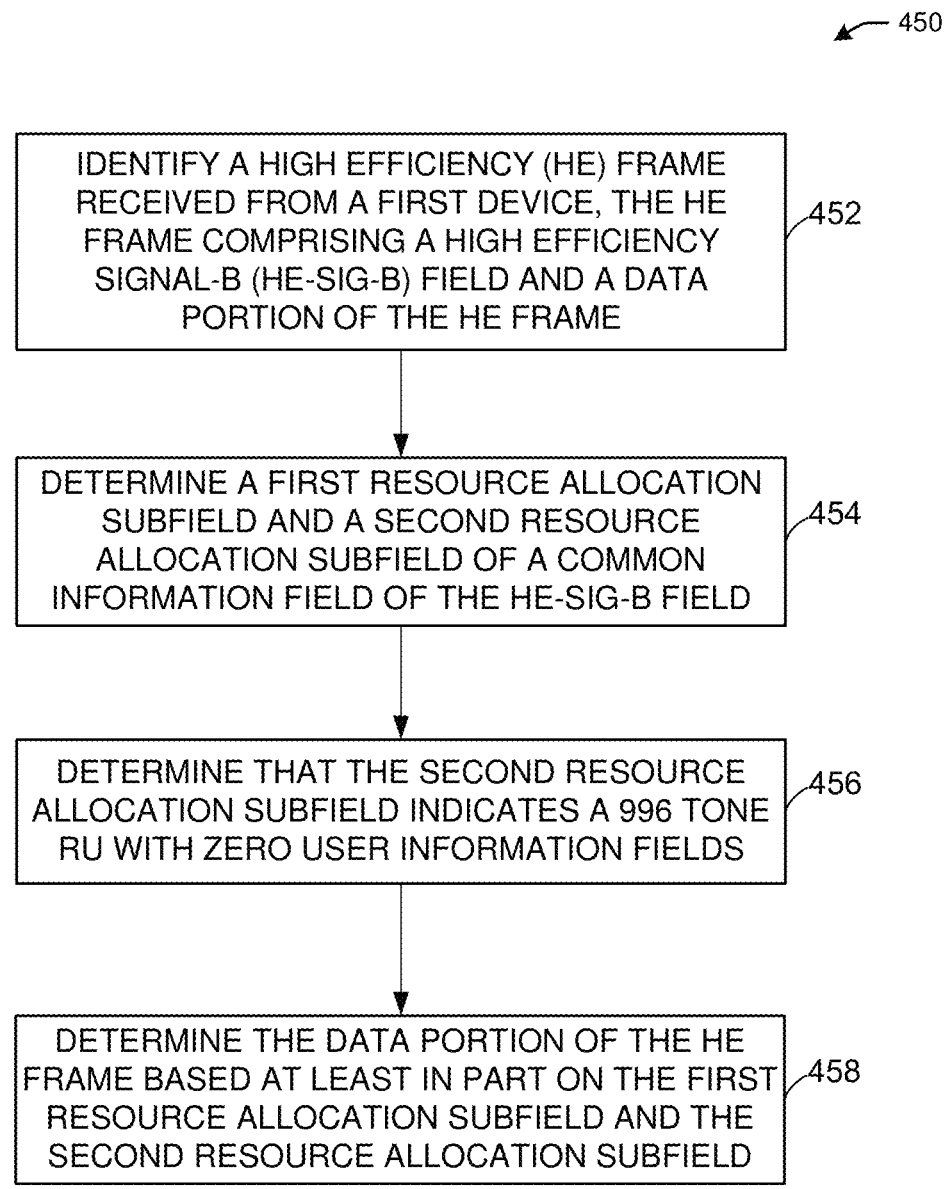
FIG. 4B depicts a flow diagram of an illustrative process for using enhanced HE frames, in accordance with one or more example embodiments of the present disclosure.

FIG. 4B depicts a flow diagram of an illustrative process 450 for using enhanced HE frames, in accordance with one or more example embodiments of the present disclosure.

At block 452, one or more processors of a device (e.g., user device 120 of FIG. 1) may identify a high efficiency (HE) frame received from a first device, the HE frame comprising a high efficiency signal-B (HE-SIG-B) field and a data portion of the HE frame. The HE-SIG-B field may comprise a first HE-SIG-B content channel and a second HE-SIG-B content channel. The device may further comprise a transceiver configured to transmit and receive wireless signals. The device may further comprise one or more antennas coupled to the transceiver.

At block 454, one or more processors of the device may determine a first resource allocation subfield and a second resource allocation subfield of a common information field of the HE-SIG-B field. The first resource allocation subfield and the second resource allocation subfield may correspond to the first HE-SIG-B content channel. The first resource allocation subfield may indicate a number of user information fields in the first HE-SIG-B content channel. The common information field is a first common information field that corresponds to the first HE-SIG-B content channel. The first resource allocation subfield may include a first 8 bit value that indicates a 996 tone RU. The first resource allocation subfield may be based at least in part on a number of devices that multiplexed the RU.

At block 456, one or more processors of the device may determine that the second resource allocation subfield indicates a 996 tone RU with zero user information fields. The device may determine a third resource allocation subfield and a fourth resource allocation subfield of a second common information field that corresponds to the second HE-SIG-B content channel, wherein the third resource allocation subfield and the fourth resource allocation subfield are based at least in part on the number of tones.

At block 458, one or more processors of the device may determine the data portion of the HE frame based at least in part on the first resource allocation subfield and the second resource allocation subfield. The data portion may comprise an orthogonal frequency-division multiple access (OFDMA) 996 tone RU and a multi-user multiple input, multiple output (MU-MIMO) 996 tone RU. The HE frame may be sent in a 160 MHz channel, wherein the OFDMA 996 tone RU may be sent in a first 80 MHz subchannel and the MU-MIMO 996 tone RU may be sent in a second 80 MHz subchannel.

It is understood that the above descriptions are for purposes of illustration and are not meant to be limiting.

FIG. 5 shows a functional diagram of an exemplary communication station 500 in accordance with some embodiments. In one embodiment, FIG. 5 illustrates a functional block diagram of a communication station that may be suitable for use as an AP (e.g., AP 102 of FIG. 1) or a user device (e.g., user device(s) 120 of FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The transceiver 510 may be a device comprising both a transmitter and a receiver that are combined and share common circuitry (e.g., communication circuitry 502). The communication circuitry 502 may include amplifiers, filters, mixers, analog to digital and/or digital to analog converters. The transceiver 510 may transmit and receive analog or digital signals. The transceiver 510 may allow reception of signals during transmission periods. This mode is known as full-duplex, and may require the transmitter and receiver to operate on different frequencies to minimize interference between the transmitted signal and the received signal. The transceiver 510 may operate in a half-duplex mode, where the transceiver 510 may transmit or receive signals in one direction at a time.

The communications circuitry 502 may include circuitry that can operate the physical layer (PHY) communications and/or media access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 2, 3, 4A, and 4B.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input, multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), an Enhanced HE frame device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The Enhanced HE frame device 619 may send and/or receive a frame that includes an HE-SIG-B field that precedes a data portion of the frame. The HE-SIG-B field may provide the OFDMA and DL MU-MIMO resource allocation information to allow the STA that receives the frame to look up the corresponding resources to be used in the data portion of the frame.

The Enhanced HE frame device 619 may separately encode the HE-SIG-B field on each 20 MHz band of a 160 MHz channel. The encoding structure in one such 20 MHz band may include a common information field, if present, followed by a user information field, which together are referred to as the HE-SIG-B content channel.

The Enhanced HE frame device 619 may determine the common information field of an HE-SIG-B content channel. The common information field may contain information regarding the resource unit allocation (RA), such as the resource unit (RU) assignment to be used in the data portion in the frequency domain, the RUs allocated for MU-MIMO, and/or the number of users in MU-MIMO allocations.

The Enhanced HE frame device 619 may determine the user information field of an HE-SIG-B content channel. The user information field may include zero or more User Block fields followed by padding (if present). Each User Block field may be made up of two user information fields that contain information for two STAs to decode their payloads. The last User Block field may contain information for one or two STAs depending on the number of users indicated by the RU Allocation field and the Center 26-tone RU field.

The Enhanced HE frame device 619 may determine a 160 MHz physical layer protocol data unit (PPDU). The 160 MHz PPDU may contain two HE-SIG-B content channels, each of which may be duplicated four times. For example, each of the two HE-SIG-B content channels may be sent in a 20 MHz band and duplicated three additional times, resulting in the first content channel and its duplicates being sent over an 80 MHz band and the second content channel and its duplicates being sent over another 80 MHz band.

The Enhanced HE frame device 619 may determine an HE-SIG-B content channel 1. The HE-SIG-B content channel 1 may include a 32 bit common information field comprising four 8 bit RA subfields. The HE-SIG-B content channel 1 may further include a user information field comprising four user information subfields. The HE-SIG-B content channel 1 may be duplicated such that four instances of HE-SIG-B content channel 1 are sent over four 20 MHz bands of the 160 MHz channel. For example, HE-SIG-B content channel 1 may occupy the 20 MHz frequency segment that is lowest in frequency and may be duplicated on the 20 MHz frequency segments that are third, fifth, and seventh lowest in frequency.

The Enhanced HE frame device 619 may determine an HE-SIG-B content channel 2. The HE-SIG-B content channel 2 may include a 32 bit common information field comprising four 8 bit RA subfields. The HE-SIG-B content channel 2 may further include a user information field comprising four user information subfields. The HE-SIG-B content channel 2 may be duplicated such that four instances of HE-SIG-B content channel 2 are sent over four 20 MHz bands of the 160 MHz channel. For example, HE-SIG-B content channel 2 may occupy the 20 MHz frequency segment that is second lowest in frequency and may be duplicated on the 20 MHz frequency segments that are fourth, sixth, and eighth lowest in frequency.

The Enhanced HE frame device 619 may determine a first HE-SIG-B content channel of a 160 MHz PPDU that may carry a common information field and a user information field corresponding to RUs signaled in the common information field. The common information field of HE-SIG-B content channel 1 may contain a first RU Allocation subfield for RUs with subcarrier indices in a first range of subcarrier indices, followed by a second RU Allocation subfield for RUs with subcarrier indices in a second range of subcarrier indices, followed by a third RU Allocation subfield for RUs with subcarrier indices in a third range of subcarrier indices, followed by a fourth RU Allocation subfield for RUs with subcarrier indices in a fourth range of subcarrier indices. A range of indices refers to a subset of indices that correspond to a subset of tones of an RU.

The Enhanced HE frame device 619 may determine a second HE-SIG-B content channel of a 160 MHz PPDU that may carry a common information field and a user information field corresponding to RUs signaled in the common information field. The common information field of HE-SIG-B content channel 2 may contain a first RU Allocation subfield for RUs with subcarrier indices in a first range of subcarrier indices, followed by a second RU Allocation subfield for RUs with subcarrier indices in a second range of subcarrier indices, followed by a third RU Allocation subfield for RUs with subcarrier indices in a third range of subcarrier indices, followed by a fourth RU Allocation subfield for RUs with subcarrier indices in a fourth range of subcarrier indices.

The Enhanced HE frame device 619 may determine a modified mapping of the two HE-SIG-B content channels. In the case of an RU with a size that equals 996 tones, there may be an ambiguity in which two RU Allocation subfields (e.g., RA 1 and RA 3 for content channel 1 and RA 2 and RA 4 for content channel 2) point to the same user information fields. For example, each 8 bit RA in a 20 MHz channel indicates the user resource allocation structure in that 20 MHz channel. In a 160 MHz/80+80 MHz channel scenario, RA 1 and RA 3 point to the same user information field in content channel 1. In other words, RA 1 and RA 3 include a resource allocation for 20 MHz channel 1 and for 20 MHz channel 3. If the data is on an 80 MHz channel, then RA 1 and RA 3 will point to the same user information field because user information subfield (UF) 1 and UF 3 are included in the same 80 MHz channel. Similarly, RA 2 and RA 4 will point to the same user information field because UF 2 and UF 4 are included in the same 80 MHz channel.

The Enhanced HE frame device 619 may determine a 160 MHz/80+80 MHz channel with a first multi-user scheme (e.g., MU-MIMO and/or OFDMA) populated in one 996 tone RU and a second multi-user scheme (e.g., MU-MIMO and/or OFDMA) populated in a second 996 tone RU).

The Enhanced HE frame device 619 may determine a modified mapping of the two HE-SIG-B content channels. The modified mapping of the two HE-SIG-B content channels may determine that the content that corresponds to RA 3 of HE-SIG-B content channel 1 may be set to 0 and the content that corresponds to RA 4 of HE-SIG-B content channel 2 may be set to 0. In such a scenario, the receiving STA may determine RA 1 and RA 3 for HE-SIG-B content channel 1 and RA 2 and RA 4 for HE-SIG-B content channel 2.

The Enhanced HE frame device 619 may determine that HE-SIG-B content channel 1 may include a 32 bit common information field comprising RA 1, RA 3=0, RA 5, and RA 7. The HE-SIG-B content channel 1 may further include user information field that includes UF 1, UF 5, and UF 7. The HE-SIG-B content channel 1 may be duplicated such that four copies of HE-SIG-B content channel 1 are sent over four 20 MHz bands of the 160 MHz channel. For example, HE-SIG-B content channel 1 may occupy the 20 MHz frequency segment that is lowest in frequency and may be duplicated on the 20 MHz frequency segments that are third, fifth, and seventh lowest in frequency.

The Enhanced HE frame device 619 may determine that HE-SIG-B content channel 2 may include a 32 bit common information field comprising RA 2, RA 4=0, RA 6, and RA 8. The HE-SIG-B content channel 2 may further include user information field that includes UF 2, UF 6, and UF 8. The HE-SIG-B content channel 2 may be duplicated such that four copies of HE-SIG-B content channel 2 are sent over four 20 MHz bands of the 160 MHz channel. For example, HE-SIG-B content channel 2 may occupy the 20 MHz frequency segment that is second lowest in frequency and may be duplicated on the 20 MHz frequency segments that are fourth, sixth, and eighth lowest in frequency.

The Enhanced HE frame device 619 may determine the first 8-bit RU Allocation subfield of the common information field of each HE-SIG-B content channel. For example, for each HE-SIG-B content channel, the first 8-bit RU Allocation subfield used to signal the 996-tones RU may use entry 11010y2y1y0, wherein y2y1y0 may indicate the number of user information fields signaled in the corresponding content channel. Specifically, y2y1y0 is a binary vector with values that range from 000-111 and is indicative of the number of user information fields in the HE-SIG-B content channel.

The Enhanced HE frame device 619 may determine the second 8-bit RU Allocation subfield of the common information field of each HE-SIG-B content channel. For example, for each HE-SIG-B content channel, the second 8-bit RU Allocation subfield used to signal that 996-tones RU (e.g., RA 3 for content channel 1 and RA 4 for content channel 2) shall be set to 01110011. The entry 01110011 may indicate a 996-tone RU with zero user information fields indicated in this RU Allocation subfield of the HE-SIG-B content channel.

The Enhanced HE frame device 619 may be configured to perform the operations detailed in FIGS. 2, 3, 4A, and 4B. It is understood that the above are only a subset of what the Enhanced HE frame device 619 may be configured to perform and that other functions included throughout this disclosure may also be performed by the Enhanced HE frame device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a single input single output (SISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device, the device comprising processing circuitry coupled to storage, the processing circuitry configured to: determine a high efficiency signal-B (HE-SIG-B) field for a high efficiency (HE) frame, the HE-SIG-B field comprising a common information field and a user information field; determine a data portion of the HE frame, wherein the data portion includes one or more resource units (RUs) with a size equal to a number of tones; determine a first resource allocation subfield and a second resource allocation subfield of the common information field based at least in part on the number of tones; and cause to send the HE frame.

Example 2 may include the device of example 1 and/or some other example herein, wherein the data portion comprises an orthogonal frequency-division multiple access (OFDMA) 996 tone RU and a multi-user multiple input, multiple output (MU-MIMO) 996 tone RU.

Example 3 may include the device of example 2 and/or some other example herein, wherein the HE frame is sent in a 160 MHz channel, and wherein the OFDMA 996 tone RU is sent in a first 80 MHz subchannel and the MU-MIMO 996 tone RU is sent in a second 80 MHz subchannel.

Example 4 may include the device of example 1 and/or some other example herein, wherein the first resource allocation subfield includes a first 8 bit value that indicates a 996 tone RU, and wherein the second resource allocation subfield includes a second 8 bit value that indicates a 996 tone RU with zero user information fields.

Example 5 may include the device of example 4 and/or some other example herein, wherein the first resource allocation subfield is based at least in part on a number of devices that multiplexed the RU.

Example 6 may include the device of example 1 and/or some other example herein, wherein the HE-SIG-B field comprises a first HE-SIG-B content channel and a second HE-SIG-B content channel, wherein the common information field is a first common information field that corresponds to the first HE-SIG-B content channel, and wherein the processing circuitry is further configured to: determine a third resource allocation subfield and a fourth resource allocation subfield of a second common information field that corresponds to the second HE-SIG-B content channel, wherein the third resource allocation subfield and the fourth resource allocation subfield are based at least in part on the number of tones.

Example 7 may include the device of example 1 and/or some other example herein, further comprising a transceiver configured to transmit and receive wireless signals.

Example 8 may include the device of example 7 and/or some other example herein, further comprising an antenna coupled to the transceiver.

Example 9 may include a non-transitory computer-readable medium storing computer-executable instructions which when executed by one or more processors result in performing operations comprising: identifying a high efficiency (HE) frame received from a first device, the HE frame comprising a high efficiency signal-B (HE-SIG-B) field and a data portion of the HE frame; determining a first resource allocation subfield and a second resource allocation subfield of a common information field of the HE-SIG-B field; determining that the second resource allocation subfield indicates a 996 tone RU with zero user information fields; and determining the data portion of the HE frame based at least in part on the first resource allocation subfield and the second resource allocation subfield.

Example 10 may include the non-transitory computer-readable medium of example 9 and/or some other example herein, wherein the HE-SIG-B field comprises a first HE-SIG-B content channel and a second HE-SIG-B content channel, wherein the first resource allocation subfield and the second resource allocation subfield correspond to the first HE-SIG-B content channel, and wherein the first resource allocation subfield indicates a number of user information fields in the first HE-SIG-B content channel.

Example 11 may include the non-transitory computer-readable medium of example 10 and/or some other example herein, wherein the common information field is a first common information field that corresponds to the first HE-SIG-B content channel, and wherein the operations further comprise: determining a third resource allocation subfield and a fourth resource allocation subfield of a second common information field that corresponds to the second HE-SIG-B content channel, wherein the third resource allocation subfield and the fourth resource allocation subfield are based at least in part on a number of tones in the RU.

Example 12 may include the non-transitory computer-readable medium of example 9 and/or some other example herein, wherein the data portion comprises an orthogonal frequency-division multiple access (OFDMA) 996 tone RU and a multi-user multiple input, multiple output (MU-MIMO) 996 tone RU.

Example 13 may include the non-transitory computer-readable medium of example 12 and/or some other example herein, wherein the HE frame is sent in a 160 MHz channel, and wherein the OFDMA 996 tone RU is sent in a first 80 MHz subchannel and the MU-MIMO 996 tone RU is sent in a second 80 MHz subchannel.

Example 14 may include the non-transitory computer-readable medium of example 9 and/or some other example herein, wherein the first resource allocation subfield includes a first 8 bit value that indicates a 996 tone RU, and wherein the first resource allocation subfield is based at least in part on a number of devices that multiplexed the RU.

Example 15 may include a method comprising: determining, by one or more processors of a device, a high efficiency signal-B (HE-SIG-B) field for a high efficiency (HE) frame, the HE-SIG-B field comprising a common information field and a user information field; determining, by the one or more processors, a data portion of the HE frame, wherein the data portion includes one or more resource units (RUs) with a size equal to a number of tones; determining, by the one or more processors, a first resource allocation subfield and a second resource allocation subfield of the common information field based at least in part on the number of tones; and causing to send, by the one or more processors, the HE frame.

Example 16 may include the method of example 15 and/or some other example herein, wherein the data portion comprises an orthogonal frequency-division multiple access (OFDMA) 996 tone RU and a multi-user multiple input, multiple output (MU-MIMO) 996 tone RU.

Example 17 may include the method of example 16 and/or some other example herein, wherein the HE frame is sent in a 160 MHz channel, and wherein the OFDMA 996 tone RU is sent in a first 80 MHz subchannel and the MU-MIMO 996 tone RU is sent in a second 80 MHz subchannel.

Example 18 may include the method of example 15 and/or some other example herein, wherein the first resource allocation subfield includes a first 8 bit value that indicates a 996 tone RU and wherein the second resource allocation subfield includes a second 8 bit value that indicates a 996 tone RU with zero user information fields.

Example 19 may include the method of example 18 and/or some other example herein, wherein the first resource allocation subfield is based at least in part on a number of devices that multiplexed the RU.

Example 20 may include the method of example 15 and/or some other example herein, wherein the HE-SIG-B field comprises a first HE-SIG-B content channel and a second HE-SIG-B content channel, wherein the common information field is a first common information field that corresponds to the first HE-SIG-B content channel, and wherein the method further comprises: determining, by the one or more processors, a third resource allocation subfield and a fourth resource allocation subfield of a second common information field that corresponds to the second HE-SIG-B content channel, wherein the third resource allocation subfield and the fourth resource allocation subfield are based at least in part on the number of tones.

Example 21 may include an apparatus comprising means for: determining a high efficiency signal-B (HE-SIG-B) field for a high efficiency (HE) frame, the HE-SIG-B field comprising a common information field and a user information field; determining a data portion of the HE frame, wherein the data portion includes one or more resource units (RUs) with a size equal to a number of tones; determining a first resource allocation subfield and a second resource allocation subfield of the common information field based at least in part on the number of tones; and causing to send the HE frame.

Example 22 may include the apparatus of example 21 and/or some other example herein, wherein the data portion comprises an orthogonal frequency-division multiple access (OFDMA) 996 tone RU and a multi-user multiple input, multiple output (MU-MIMO) 996 tone RU.

Example 23 may include the apparatus of example 22 and/or some other example herein, wherein the HE frame is sent in a 160 MHz channel, and wherein the OFDMA 996 tone RU is sent in a first 80 MHz subchannel and the MU-MIMO 996 tone RU is sent in a second 80 MHz subchannel.

Example 24 may include the apparatus of example 21 and/or some other example herein, wherein the first resource allocation subfield includes a first 8 bit value that indicates a 996 tone RU and wherein the second resource allocation subfield includes a second 8 bit value that indicates a 996 tone RU with zero user information fields.

Example 25 may include the apparatus of example 24 and/or some other example herein, wherein the first resource allocation subfield is based at least in part on a number of devices that multiplexed the RU.

Example 26 may include the apparatus of example 21 and/or some other example herein, wherein the HE-SIG-B field comprises a first HE-SIG-B content channel and a second HE-SIG-B content channel, wherein the common information field is a first common information field that corresponds to the first HE-SIG-B content channel, and wherein the apparatus further comprises means for: determining a third resource allocation subfield and a fourth resource allocation subfield of a second common information field that corresponds to the second HE-SIG-B content channel, wherein the third resource allocation subfield and the fourth resource allocation subfield are based at least in part on the number of tones.

Example 27 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 28 may include an apparatus comprising logic, modules, and/or circuitry to perform one or more elements of a method described in or related to any of examples 1-26, or any other method or process described herein.

Example 29 may include a method, technique, or process as described in or related to any of examples 1-26, or portions or parts thereof.

Example 30 may include an apparatus comprising: one or more processors and one or more computer readable media comprising instructions that, when executed by the one or more processors, cause the one or more processors to perform the method, techniques, or process as described in or related to any of examples 1-26, or portions thereof.

Example 31 may include a method of communicating in a wireless network as shown and described herein.

Example 32 may include a system for providing wireless communication as shown and described herein.

Example 33 may include a device for providing wireless communication as shown and described herein.

Embodiments according to the invention are in particular disclosed in the attached claims directed to a method, a storage medium, a device and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   determine a first resource unit (RU) allocation comprising a first 996 tones allocated in a channel to a station device;
   generate a first indication of the first RU allocation, the first indication consisting of a first eight bits, wherein each of the first eight bits indicate the first RU allocation;
   generate a second indication of a second RU allocation in the channel and subsequent in time to the first RU allocation, the second indication consisting of a second eight bits whose value is equal to decimal 115, wherein each of the second eight bits indicate the second RU allocation;
   generate a high efficiency signal-B (HE-SIG-B) field for a high efficiency (HE) frame, the HE-SIG-B field comprising a common information field, the common information field comprising the first indication of the first RU allocation and the second indication of the second RU allocation; and
   send the HE frame to the station device.

2. The device of claim 1, wherein the first indication of the first RU allocation and the second indication of the second RU allocation are consecutive in time subfields of the common information field.

3. The device of claim 1, wherein the processing circuitry is further configured to:
   encode a first user information field subsequent to the common information field in the HE-SIG-B field, the first user information field comprising an indication of the station device; and
   based on the first RU allocation comprising the first 996 tones, refrain from encoding a second user information field in the HE-SIG-B field.

4. The device of claim 1, wherein the first RU allocation comprises an orthogonal frequency-division multiple access (OFDMA) 996-tone RU and a multi-user multiple input, multiple output (MU-MIMO) 996-tone RU.

5. The device of claim 1, wherein the first RU allocation is based at least in part on a number of station device user information fields included in the RU.

6. The device of claim 1, wherein a first HE-SIG-B field is associated with first HE-SIG-B content channel and a second HE-SIG-B field is associated with a second content channel.

7. The device of claim 1, wherein a value of the first eight bits of the first RU allocation indicates on a number of user information fields signaled in the first RU allocation.

8. The device of claim 1, wherein the first eight bits of the first RU allocation is equal to 11010y2y1y0, wherein y2y1y0 is a binary vector having a value range of 000-111.

9. The device of claim 1, further comprising a transceiver configured to transmit and receive wireless signals, comprising the HE frame.

10. The device of claim 9, further comprising an antenna coupled to the transceiver to cause to send the HE frame.

11. A non-transitory computer-readable medium storing computer-executable instructions which when executed by one or more processors result in performing operations comprising:
    determining a first resource unit (RU) allocation comprising a first 996 tones allocated in a channel to a station device;
    generating a first indication of the first RU allocation, the first indication consisting of a first eight bits, wherein each of the first eight bits indicate the first RU allocation;
    generating a second indication of a second RU allocation in the channel and subsequent in time to the first RU allocation, the second indication consisting of a second eight bits whose value is equal to decimal 115, wherein each of the second eight bits indicate the second RU allocation;
    generating a high efficiency signal-B (HE-SIG-B) field for a high efficiency (HE) frame, the HE-SIG-B field comprising a common information field, the common information field comprising the first indication of the first RU allocation and the second indication of the second RU allocation; and
    sending the HE frame to the station device.

12. The non-transitory computer-readable medium of claim 11, wherein the first indication of the first RU allocation and the second indication of the second RU allocation are consecutive in time subfields of the common information field.

13. The non-transitory computer-readable medium of claim 11, the operations further comprising:
   encoding a first user information field subsequent to the common information field in the HE-SIG-B field, the first user information field comprising an indication of the station device; and
   based on the first RU allocation comprising the first 996 tones, refraining from encoding a second user information field in the HE-SIG-B field.

14. The non-transitory computer-readable medium of claim 11, wherein the first RU allocation comprises an orthogonal frequency-division multiple access (OFDMA) 996-tone RU and a multi-user multiple input, multiple output (MU-MIMO) 996-tone RU.

15. The non-transitory computer-readable medium of claim 11, wherein the first RU allocation is based at least in part on a number of station device user information fields included in the RU.

16. The non-transitory computer-readable medium of claim 11, wherein a first HE-SIG-B field is associated with first HE-SIG-B content channel and a second HE-SIG-B field is associated with a second content channel.

17. The non-transitory computer-readable medium of claim 11, wherein the first eight bits of the first RU allocation is equal to 11010y2y1y0, wherein y2y1y0 is a binary vector having a value range of 000-111.

18. A method comprising:
   determining, by processing circuitry of an access point device, a first resource unit (RU) allocation comprising a first 996 tones allocated in a channel to a station device;
   determining, by the processing circuitry, a second RU allocation comprising a second 996 tones;
   generating, by the processing circuitry, a first indication of the first RU allocation, the first indication consisting of a first eight bits, wherein each of the first eight bits indicate the first RU allocation;
   generating, by the processing circuitry, a second indication of a second RU allocation in the channel and subsequent in time to the first RU allocation, the second indication consisting of a second eight bits whose value is decimal 115, wherein each of the second eight bits indicate the second RU allocation;
   generating, by the processing circuitry, a high efficiency signal-B (HE-SIG-B) field for a high efficiency (HE) frame, the HE-SIG-B field comprising a common information field, the common information field comprising the first indication of the first RU allocation and the second indication of the second RU allocation; and
   sending, by the processing circuitry, the HE frame to the station device.

19. The method of claim 18, further comprising:
   encoding a first user information field subsequent to the common information field in the HE-SIG-B field, the first user information field comprising an indication of the station device; and
   based on the first RU allocation comprising the first 996 tones, refraining from encoding a second user information field in the HE-SIG-B field.

* * * * *